United States Patent [19]

Swann

[11] Patent Number: 4,932,717
[45] Date of Patent: Jun. 12, 1990

[54] PICKUP TRUCK BED CAP

[76] Inventor: Jack D. Swann, 3668 Cascade Palmetto Hwy., Atlanta, Ga. 30331

[21] Appl. No.: 294,890

[22] Filed: Jan. 9, 1989

[51] Int. Cl.⁵ ............................................. B60J 5/12
[52] U.S. Cl. ................................... 296/216; 296/100
[58] Field of Search .................. 296/216, 100, 50, 51, 296/56, 106, 202, 146

[56] References Cited

U.S. PATENT DOCUMENTS

| | | |
|---|---|---|
| 2,086,091 | 7/1937 | Payette ................................. 296/100 |
| 2,744,782 | 5/1956 | Backman . |
| 2,992,040 | 7/1961 | Groth et al. ......................... 296/100 |
| 3,357,738 | 12/1967 | Bourlier ........................... 296/216 X |
| 4,063,774 | 12/1977 | Hanks ................................... 296/216 |
| 4,140,339 | 2/1979 | Fredin .................................. 296/100 |
| 4,221,423 | 9/1980 | Stone ................................... 296/100 |
| 4,268,084 | 5/1981 | Peters ................................... 296/100 |
| 4,272,121 | 6/1981 | Kim ..................................... 296/216 |
| 4,277,098 | 7/1981 | Gibney . |
| 4,335,916 | 7/1982 | Gutgsell . |
| 4,418,954 | 12/1983 | Buckley . |
| 4,511,173 | 4/1985 | Wentzel . |
| 4,626,024 | 12/1986 | Swann . |
| 4,630,858 | 12/1986 | Bez .................................. 296/216 X |

FOREIGN PATENT DOCUMENTS 141823 6/1988 Japan .................................... 296/216

Primary Examiner—Margaret A. Focarino
Assistant Examiner—Joseph D. Pape
Attorney, Agent, or Firm—Thomas & Kennedy

[57] ABSTRACT

A truck cap [12] has an upper panel [13], rear panels [15, 15'], and an articulated door [16]. The door [16] comprises an upper section [17] and a rear section [18] and is capable of movement between a closed position, partly opened positions exposing a rear opening [28], and a fully opened position exposing both rear and upper openings [28, 29]. Support ledges [25, 26] are mounted to the upper panel [13] to support the door [16] in its closed and partly opened positions. Securing elements [19, 20] secure the door [16] in its fully opened position.

14 Claims, 3 Drawing Sheets

PICKUP TRUCK BED CAP

TECHNICAL FIELD

This invention relates generally to trucks, and particularly to pickup truck caps used to enclose open truck beds.

BACKGROUND OF THE INVENTION

Pickup trucks enjoy popularity due to their unique ability to provide both personal and cargo transportation. Pickup trucks have an enclosed cab in which a driven and passengers may be seated side by side. An open top cargo bed extends rearwardly from the cab. The bed is bordered by two sides and a rear tailgate. The openness of pickup truck beds renders them quite versatile in their ability to carry loads of different configurations. Also, since their cargo space is open to ambience, pickup trucks may be loaded and unloaded from both sides and from the rear. This openness and loading ease, however, is provided at a sacrifice in security, privacy and shelter.

To provide such security, privacy and shelter, removable truck caps have been devised. Inherently, however, they restrict and handicap access to the beds. Thus, it would be desirable to devise a truck cap that could provide security, privacy and shelter while still providing relative ease of access for loading and unloading. Accordingly, it is to the provision of such a truck cap that the present invention is primarily directed.

SUMMARY OF THE INVENTION

In one form of the invention, a truck cap has side, top, and rear panels for covering a truck bed, an opening formed in adjacent portions of the top panel and the rear panel, and an articulated door. The articulated door includes an upper door section pivotably mounted to the upper panel for movement between open and closed positions, and a rear door section pivotably mounted to the upper door section for movement between a position folded adjacent the upper door section and a position spread from the upper door section.

The articulated door is capable of being moved between closed, partly open and fully open positions. In its closed position its upper door section is positioned coextensively with the upper panel and its rear door section is positioned coextensively with the rear panel. In one partly open position the rear door section is folded flushly under the upper door section with both sections supported by a support means coextensively with the upper panel. Alternatively, the same support means may be used to support the door sections in a raised, jack-knifed position. In the fully open position the rear door section is folded flushly upon the upper door section with both sections supported upon the upper panel of the cap.

The cap further includes securing means for securing the door in its fully open and partly open positions. The securing means includes a pair of guide rails mounted to the upper panel and a crossbar movably mounted upon the guide rails. The crossbar has a spring for urging the door sections against the upper cab panel, to prevent them from being lifted by wind during truck movement, and a spar for securing articles to the crossbar atop the cab.

BRIEF DESCRIPTION OF THE DRAWINGS

FIG. 4 is an enlarged, perspective view of a portion of the cap door securing means shown supporting a ladder.

DETAILED DESCRIPTION

Figure 1:
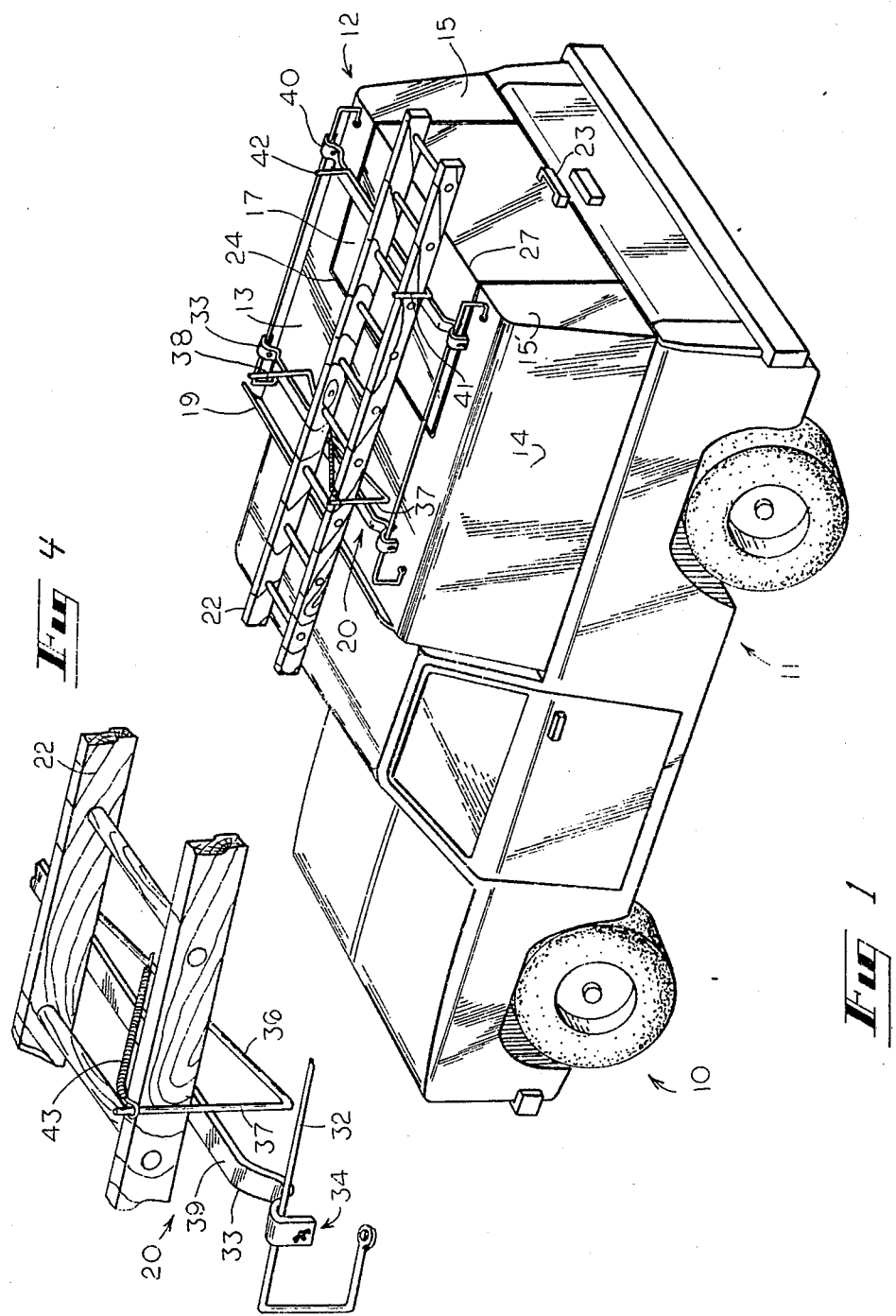
FIG. 1 is a perspective view of a pickup truck showing a cap mounted thereon that embodies principles of the invention in a preferred form.

With reference next to the drawings, there is shown a pickup truck 10 having a rear portion 11 and a cap 12 removably mounted atop the rear portion. Cap 12 has an upper panel 13, two side panels 14, and two rear panels 15 and 15' with all of the panels being of unitary construction. The two rear panels define a rear opening 28 therebetween. The cap also has a unique articulated door 16 comprised of an upper door section or closure 17 and a rear door section or closure 18. Means indicated generally at 20 in FIG. 1 are provided for both securing the door atop the upper panel 13, and for supporting cargo, such as the ladder illustrated at 22. A resilient airfoil 19 is mounted on the forward end of the cap panel 13 which also functions to secure the door 16 in its fully opened position.

Figure 2:
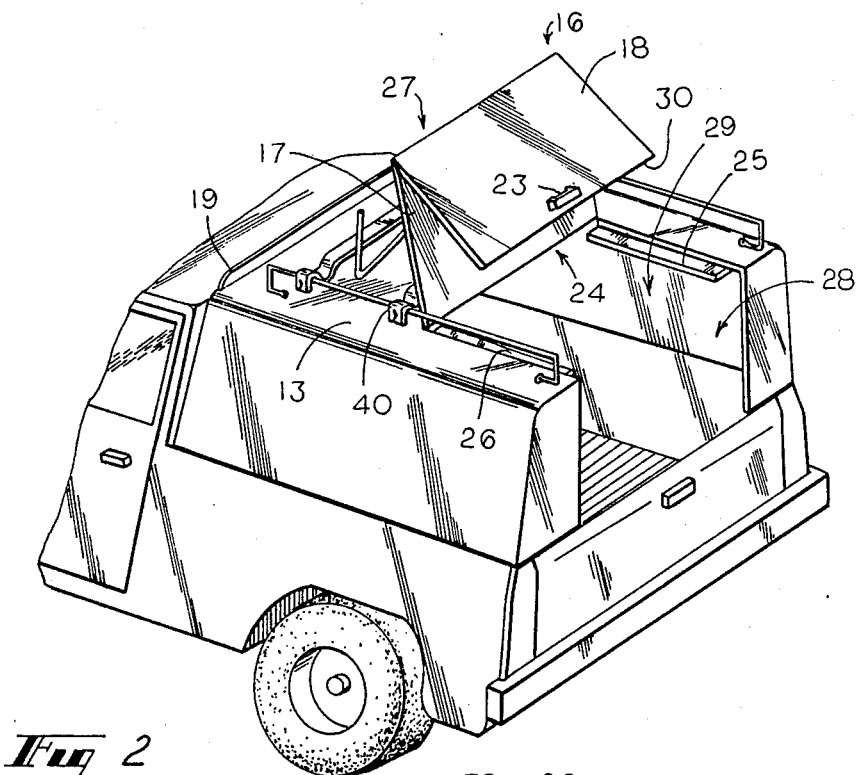
FIG. 2 is a perspective view of a portion of the pickup truck shown in FIG. 1 with the truck cap articulated door in an unsecured transitory partially opened position.
Figure 3:
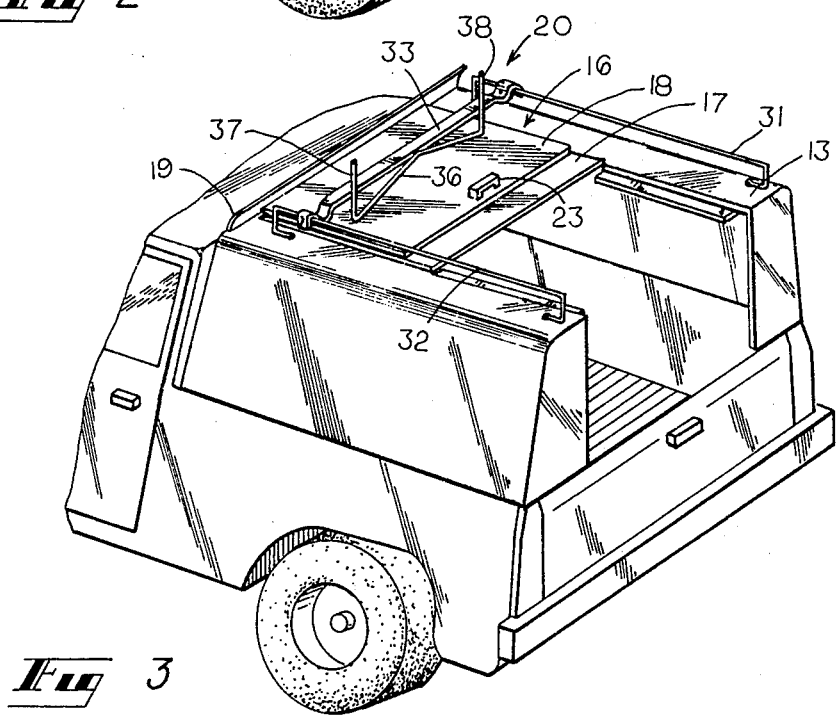
FIG. 3 is another perspective view of the same portion of the pickup truck with the truck cap articulated door positioned in its secured, fully opened position.
Figure 6:
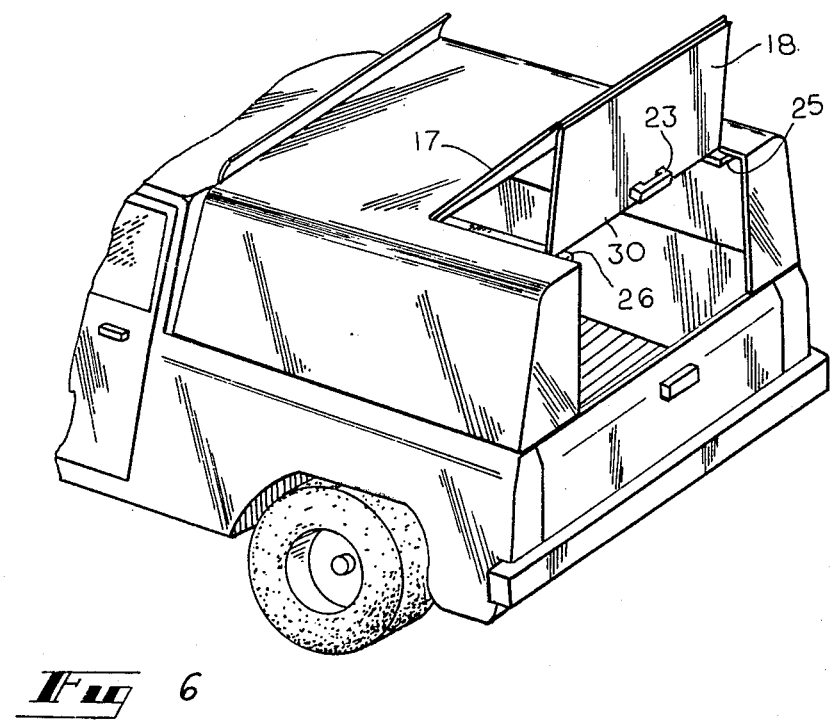
FIG. 6 is yet another perspective view of the pickup truck showing the cap articulated door in another partially opened position and with the securing means again omitted.

The articulated door 16 is designed for movement between the fully closed position illustrated in FIG. 1, the partly opened positions illustrated in FIGS. 2 and 6, and the fully opened position illustrated in FIG. 3. When the door is in its fully closed position its upper door section 17 is positioned coextensively with upper panel 13 and its rear door section 18 is positioned coextensively with the rear panels 15 and 15'

The upper door section 17 is hinged to the upper cap panel 13 along a section edge 24. It may be pivoted about this hinge to the partly opened position of FIGS. 2 and 6, and be further pivoted to the fully opened position shown in FIGS. 3. In the fully closed position, the upper door section 17 is supported by a pair of ledges 25 and 26 which are located on opposite, fore and aft extending sides of an upper opening 29 in the cap upper panel 13 which merges with the rear opening 28.

Figure 5:
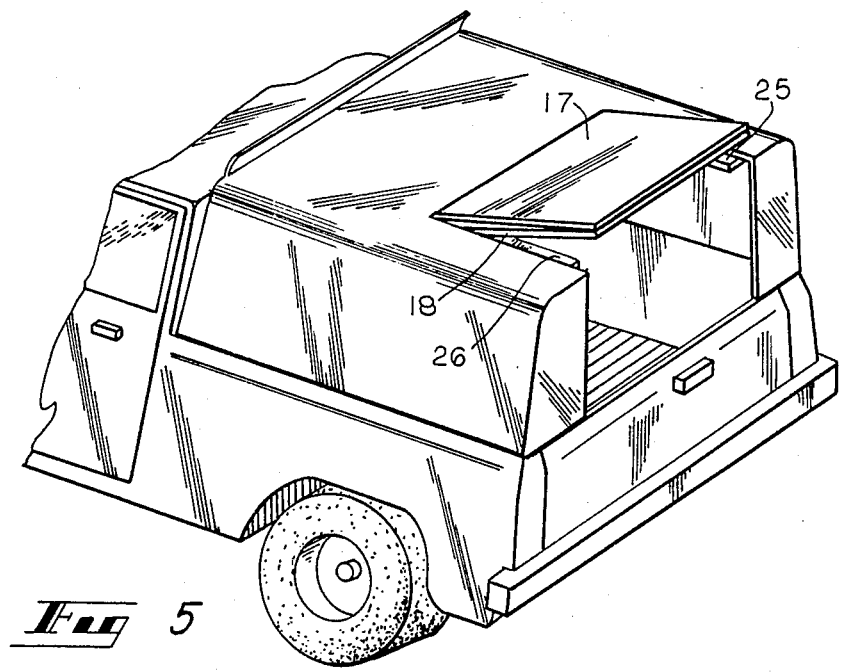
FIG. 5 is another perspective view of a portion of the pickup truck with the cap articulated door shown in a transitory position and with the securing means omitted for clarity.

The rear door section 18 is hinged to a second edge 27 of the upper door section 17 for pivotable movement between a position spaced or splayed from the upper door section 17, as shown in FIGS. 1, 2 and 6, and a position folded upon the upper section 18 as shown in FIG. 3 and also a position folded underneath the upper section as shown in FIG. 5. A handle 23 is mounted to the rear door section 18.

Referring particularly to FIGS. 3 and 4, the combined cargo and door securing means 20 is seen to include a pair of guide rails 31 and 32 fixedly mounted atop the upper panel 13. The rails are mounted in a location so as to straddle the opening 29 so that they do not interfere with movement of the articulated door. A crossbar forward 33 is slidably attached to the rails by means of bolts and wing nuts as indicated generally at 34 in FIG. 4. A spring 36 is welded to the crossbar 33 for urging the articulated door 16 toward the upper cab panel 13 when the door is in its fully opened position. A pair of upright rods or spars 37 and 38 are mounted to, or formed in, the ends of the spring 36. A rear crossbar 40 is slidably attached to the rails. Like crossbar 33, crossbar 40 is releasibly attached to the rail by means of bolts and wing nuts. It too has a pair of elongated upright spars 41 and 42.

OPERATION

The pickup truck may be driven with its cargo space completed enclosed by the cab as shown in FIG. 1 and with cargo like the ladder carried outside upon the cab top. In this configuration access may be had to the cargo space by merely grasping the handle and pivoting the rear door section outwardly and upwardly. This type of access, however, is normally obtained only to place or remove an article located on the rear of the bed adjacent the tailgate. To obtain greater access to the pickup truck bed any load on the top, such as the ladder illustrated in FIG. 1, is removed and the rear crossbeam relocated so as not to overlay the opening in the top panel and the upper section of the door. This may be done by loosening the wing bolts and sliding the rear crossbeam forwardly to the position shown in FIG. 2. Alternatively, only one side of the crossbeam may be detached and the crossbeam then pivoted about the opposite rail. As another alternative the crossbeam may be completed removed.

With the opening 29 in the upper panel now unrestricted by cargo or the cargo securing means, the articulated door may be raised and located in numerous positions. For example, the rear door section may be raised so as to cause the entire door to jackknife and then the door temporarily located in its partially opened position with the edge of the rear door section sat upon the ledges blank as shown in FIG. 6. In this position access is provided to the rear section of the cargo space enclosed by the cap. The size of the opening at the top of the cab may be changed by merely sliding the bottom edge of the rear door panel fore or aft, to the degree desired, as shown in FIG. 6. The entire opening in the cab upper panel may be exposed by leaning the door against the crossbeam 40 with the rear door section folded flushing upon it. FIG. 2 illustrates the position of the articulated door preparatory to obtaining this position. In the position of FIG. 2 however, the pickup truck should not be driven since the airflow over the cap would tend to cause the door to fall abruptly. For vehicle movement with the door fully opened, it should be oriented in the position of FIG. 3.

In FIG. 3 the articulated door is seen to have its rear door section folded flush atop its upper section which in turn rests upon the top of the cab upper panel, or any protective stops or cushioning devices secured thereto. In moving it to this position the hinged edge 27 of the door has contacted and briefly flexed the airfoil 19 forwardly. Thereafter the airfoil aids in preventing airflow over the truck as it moves from lifting the door. As an added measure in preventing wind from unfolding and lifting the door, the forward crossbeam is secured in the place illustrated in FIG. 3. This causes its spring member to clasp the door down firmly upon the top of the cab.

Finally the articulated door may also be moved to a position fully closing the upper opening 29 and fully opening the rear opening 28 with the rear section folded beneath the upper section and supported upon the ledges 25 and 26. FIG. 5 illustrates the door closely adjacent to this position. This might be preferred where some shelter against adverse weather is temporarily desired and yet access to at least the rear portion of the cargo space is also desired.

It thus is seen that a pickup truck bed cap is now provided with an articulated door of unique configuration which is extremely versatile in its capabilities of providing varying degrees of access to cargo space. It should be understood however, that the just described embodiment merely illustrates principles of the invention in a preferred form. Many modifications, additions and deletions may, of course, be made thereto without departure from the spirit and scope of the invention as set forth in the following claims.

I claim:

1. A cap for the bed of a pickup truck comprising an upper panel, two side panels, a rear panel with said upper, side and rear panels forming a unitary structure; an articulated door having an upper door section and a rear door section pivotably attached to said upper door section, said upper door section being pivotably attached to said upper panel for movement between (1) a closed position in which said upper door section is generally coextensive with said upper panel and said rear door section is generally coextensive with said rear panel, (2) a partly opened position in which said rear door section is folded underneath said upper door section with said upper and rear door sections being generally coextensive with said upper panel, and (3) a fully opened position in which said rear door section is folded upon said upper door section with said upper and rear door sections overlaying said upper panel; and support means for supporting said upper door section with said door in said closed position and for supporting said rear door section with said door in said partly opened position.

2. The truck cap of claim 1 wherein said upper panel has an opening, and wherein said support means comprises a pair of ledges mounted to said cab upper panel at least partially framing said opening.

3. The truck cap of claim 1 further comprising means for securing said first and second door sections with said door in said fully opened position.

4. A cap for the bed of a pickup truck comprising an upper panel having an opening; a rear panel; an articulated door having an upper door section and a rear door section pivotably attached to said upper door section, said upper door section being pivotably attached to said upper panel for movement between (1) a closed position in which said upper door section is generally coextensive with said upper panel and said rear door section is generally coextensive with said rear panel, (2) a partly opened position in which said rear door section is folded underneath said upper door section with said upper and reward door sections being generally coextensive with said upper panel, and (3) a fully opened position in which said rear door section is folded upon said upper door section with said upper and rear door sections overlaying said upper panel; support means having a pair of ledges mounted to said upper panel at least partially framing said opening for supporting said upper door section with said door in said closed position and for supporting said rear door section with said door in said partly opened position; and a hold-down means for holding said door sections in said partly opened position down upon said support means and which comprises a pair of rails mounted to said upper panel straddling said opening, and at least one crossbar movably mounted to said rails.

5. A cap for the bed of a pickup truck comprising an upper panel; a rear panel; an articulate door having an upper door section and a rear door section pivotably attached to said upper door section, said upper door section being pivotably attached to said upper panel for movement between (1) a closed position in which said upper door section is generally coextensive with said upper panel and said rear door section is generally coextensive with said rear panel, (2) a partly opened position in which said rear door section is folded underneath said upper door section with said upper and rear door sections being generally coextensive with said upper panel, and (3) a fully opened position in which said rear door section is folded upon said upper door section with said upper and rear door sections overlaying said upper panel; support means for supporting said upper door section with said door in said closed position and for supporting said rear door section with said door in said partly opened position; and a securing means having a pair of rails fixedly mounted to said upper panel straddling an opening in said upper panel, and a crossbar movably mounted to said rails for securing said first and second door sections with said door in said fully opened position.

6. The truck cap of claim 5 wherein said crossbar has a spring for urging said door down against said upper panel with said door in said fully opened position.

7. The truck cap of claim 6 wherein said securing means has a spar fixedly mounted uprightly to said spring, whereby articles may be supported upon the crossbar and secured by stretching an elastic strip or the like around the articles and spar.

8. The truck cap of claim 6 wherein said securing means comprises a second crossbar movably mounted to said rails for positioning beside or over said opening.

9. A cap for the bed of a pickup truck comprising an upper panel; a rear panel; an articulated door having an upper door section and a rear door section pivotably attached to said upper door section, said upper door section being pivotably attached to said upper panel for movement between a closed position in which said upper door section is generally coextensive with said upper panel and said rear door section is generally coextensive with said rear panel, and a fully open position in which said rear door section is folded adjacent said upper door section with said upper and rear door sections together overlaying said upper panel; and securing means for securing said door in said open position and which comprises first and second guide rails fixedly mounted to said upper panel and at least one crossbar mounted to said first and second guide rails.

10. The truck cap of claim 9 wherein said crossbar is releasibly mounted to said guide rails.

11. The truck cap of claim 9 wherein said crossbar includes spring means for holding said door down upon said upper panel.

12. The truck cap of claim 9 wherein said securing means comprises a resilient member fixedly mounted to said upper panel for flexibly catching engagement with an edge of said articulated door.

13. The truck cap of claim 9 further including support means for supporting said upper door section with said door in said closed position.

14. The truck cap of claim 13 wherein said upper panel has an opening and wherein said support means comprises a pair of ledges that straddle said opening.

* * * * *